United States Patent [19]
Todaka et al.

[11] Patent Number: 4,809,076
[45] Date of Patent: Feb. 28, 1989

[54] IMAGING APPARATUS USING SOLID STATE IMAGE SENSOR

[75] Inventors: Yoshihiro Todaka; Takuya Imaide, both of Yokohama, Japan

[73] Assignee: Hitachi, Ltd., Tokyo, Japan

[21] Appl. No.: 38,838

[22] Filed: Apr. 15, 1987

[30] Foreign Application Priority Data

Apr. 16, 1986 [JP] Japan .................................. 61-85924

[51] Int. Cl.[4] ............................................. H04N 5/238
[52] U.S. Cl. .................. 358/213.19; 358/228
[58] Field of Search ...................... 358/213.19, 213.15, 358/228, 909; 356/218; 357/30 G

[56] References Cited

U.S. PATENT DOCUMENTS 3,649,837  3/1972  Lehovec ........................... 357/30 G
4,242,599  12/1980  Suzuki .................................. 307/317

FOREIGN PATENT DOCUMENTS 194575  5/1984  Japan.

OTHER PUBLICATIONS

"An Electronic Still Camera System", Tanaka et al., IEEE Trans. on Consumer Electronics, vol. CE-32, No. 3, Aug. 1986, pp. 345-354.

Primary Examiner—James J. Groody
Assistant Examiner—Robert M. Bauer
Attorney, Agent, or Firm—Antonelli, Terry & Wands

[57] ABSTRACT

In an imager, an image sensor has a pn junction at which positive and negative carriers are created in accordance with a quantity of light incident to the pn junction. One type of the positive and negative carriers is read out as an image signal and as soon as the other type is created, it is delivered out of the image sensor. A photometric circuit connected to the image sensor calculates a quantity of the incident light on the basis of the other type of carriers delivered from the image sensor and generates an incident light quantity signal. In accordance with the incident light quantity signal, an incident light quantity adjusting signal generator and an incident light quantity adjuster adjust the quantity of the light incident to the image sensor to an optimum value to thereby obtain proper exposure.

14 Claims, 23 Drawing Sheets

IMAGING APPARATUS USING SOLID STATE IMAGE SENSOR

BACKGROUND OF THE INVENTION

This invention relates to an imager using a solid-state image sensor and a photometric circuit.

With the aim of obtaining a signal for exposure control, one type of prior art imager has a photometric sensor which is independent of an image sensor.

Another imager is known as disclosed in JP-A-59-194575 and it performs exposure control by using a video output signal from a solid-state image sensor adapted to obtain an image signal.

The latter imager having an iris in front of the image sensor integrates the video output signal from the image sensor to calculate a quantity of light incident to the image sensor and controls the iris in accordance with a calculated value to obtain optimum exposure.

Disadvantageously, the former prior art imager requires the photometric sensor which is independent of a image sensor.

The latter prior art imager does not require an independent photometric sensor, but because of the use of an integration signal of the video signal from the image sensor as a signal for exposure control, a current representative of the image signal read out of the image sensor is liable to be disturbed by a photometric circuit.

SUMMARY OF THE INVENTION

An object of this invention is to provide an imager having a photometric circuit capable of controlling exposure in compliance with an image signal without affecting the image signal.

Another object of this invention is to provide a photometric circuit suitable for use with the imager.

According to the invention, a quantity of light incident to the image sensor is measured using carriers created, within one of the photodiodes of the image sensor, in a pair with carriers read out as an image signal.

When light illuminates one of the photodiodes constituting an image sensor such as for example a MOS sensor or a CCD sensor, positive carriers and negative carriers are created in a pair within the photodiode in accordance with a quantity of the incident light. One type (polarity) of the positive and negative carriers created in a pair remains as electric charge within the photodiode and the other type flows out of the sensor via a substrate of the sensor and/or a bias power supply line. By sequentially reading one type of the carriers remaining as the charge in the photodiode, an image signal can be obtained. The other type of the carriers flows out of the sensor via, for example, the bias power supply line irrespective of the reading of the electric charge from the photodiode.

Incidentally, a current due to the outflow of the other type of the carriers from the sensor makes one-to-one correspondence to an amount of one type of the carriers stored in the photodiode. Therefore, by measuring the current due to the carriers of the other polarity flowing out of the sensor, an amount of the electric charge stored in the photodiode, that is, a quantity of the incident light, can be known.

In view of the above, a photometric circuit used for an imager of this invention measures the current due to the outflow of the carriers of the other polarity from the image sensor.

When controlling exposure with the imager of this invention, an iris or shutter in front of the image sensor is controlled in compliance with the measured signal.

Since the current due to the outflow of the carriers of the other polarity from the sensor develops irrespective of the reading of the electric charge due to the carriers of one polarity stored in the photodiode as described previously, the image signal is never changed by the measurement of the current due to the outflow of the carriers of the other polarity from the sensor.

DESCRIPTION OF THE PREFERRED EMBODIMENTS

Figure 1:
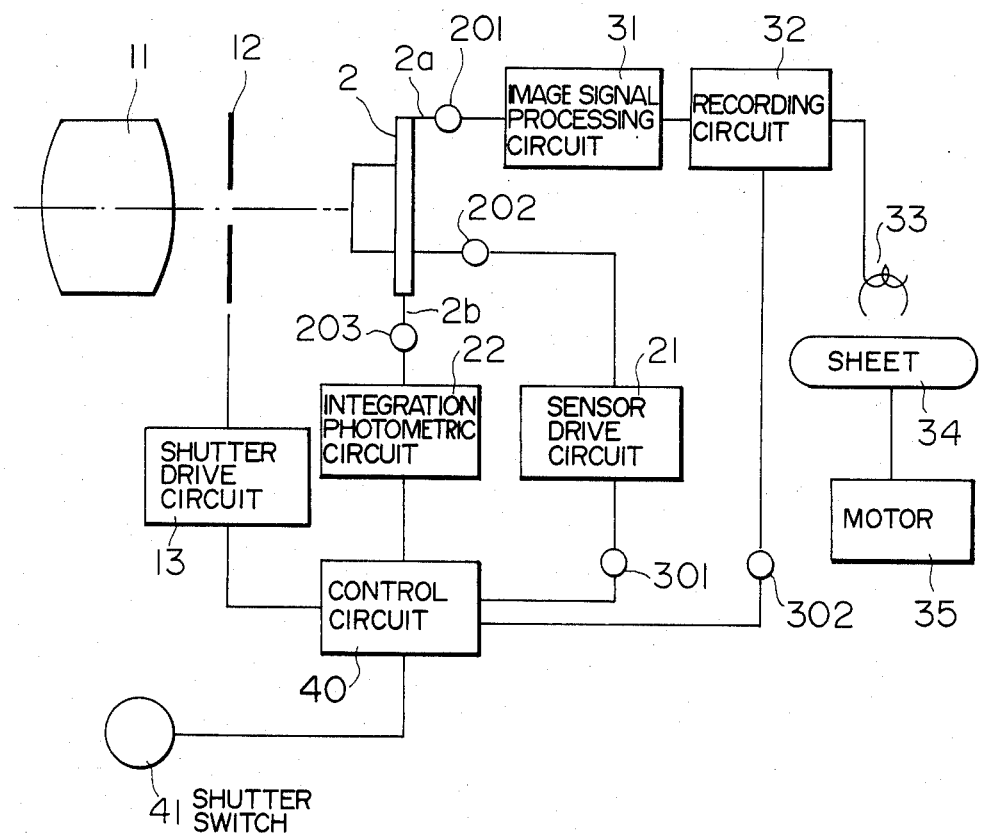
FIG. 1 is a block diagram illustrating an imager according to a first embodiment of the invention.

FIG. 1 illustrates an imager according to a first embodiment of the invention in which a photometric circuit of the invention is applied to an exposure control circuit of an electronic still camera.

An example of an electronic still camera is described in "AN ELECTRONIC STILL CAMERA SYSTEM", *IEEE Transactions on Consumer Electronics* Vol. CE-32, No. 3, August, 1986.

An electronic still camera shown in FIG. 1 comprises a lens 11, a shutter 12 also playing the part of an iris, a shutter drive circuit 13, an image sensor 2, a sensor drive circuit 21, an integration photometric circuit 22, an image signal processing circuit 31 for processing an image signal read out of the image sensor and producing a video signal, a recording circuit 32 for recording the output video signal from the image signal processing circuit 31 on a recording medium in the form of a sheet 34, a recording head 33, a motor 35 for driving the sheet 34, a control circuit 40, and a shutter switch for generating a recording trigger signal for the electronic still camera. Reference numerals 201, 202, 203, 301 and 302 denote terminals.

Within one of photodiodes on the image sensor 2, electrons and holes are created in a pair in accordance with a quantity of light incident to the photodiode through the lens 11, thus providing carriers of electric charge. In this embodiment, electrons created in the photodiode are stored therein as carriers for an image signal. The thus stored carriers or electrons are sequentially read out of the photodiode under the direction of the sensor drive circuit 21 to provide a video signal which is supplied to the recording circuit 32. Conversely, holes may be read to provide an image signal.

Figure 2:
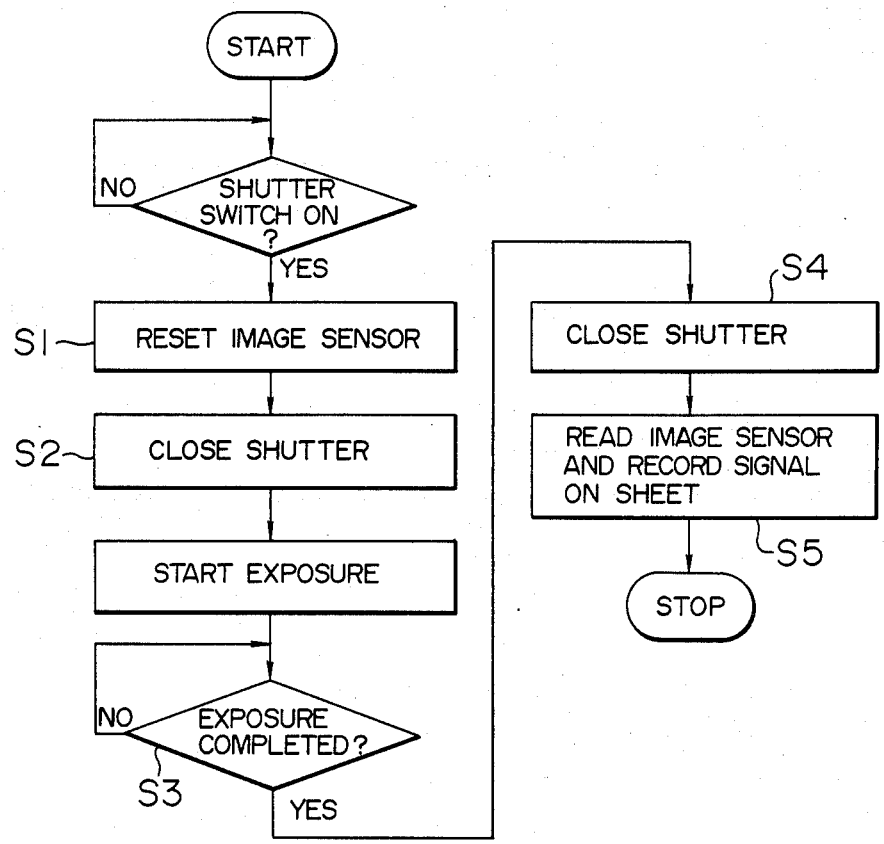
FIG. 2 is a flow chart illustrate of the operational flow in the imager shown in FIG. 1.

The exposure control operation of the electronic still camera shown in FIG. 1 will now be described with reference to a flow chart as shown in FIG. 2.

The shutter 12 remains closed until the shutter switch 41 is depressed.

When a shutter button (not shown) is depressed to cause the shutter switch 41 to issue a signal indicative of the depression of the shutter button, the control circuit 40 detects the signal and causes the sensor drive circuit 21 to reset the image sensor 2 by sweeping up all the signal charges within the image sensor 2 (step S1). Subsequently, the shutter 12 is opened by the shutter drive circuit 13 (step S2). Concurrently with the opening of the shutter 12, an exposure output signal proportional to a quantity of light illuminating the image sensor 2 is delivered to the terminal 203 and integrated by the integration photometric circuit 22 comprised of an integration circuit. The shutter 12 remains opened until an integration output signal reaches a predetermined value (step S3). When the control circuit 40 detects that a predetermined integration output signal is obtained, the shutter 12 is closed by the shutter drive circuit 13, thus completing the exposure on the image sensor 2 (step S4). Thereafter, an image signal stored in the image sensor 2 is read under the direction of the sensor drive circuit 21 and is subjected to a signal processing inclusive of γ correction by means of the image signal processing circuit 31 to provide a video signal which in turn is recorded on the sheet 34 by means of the recording head 33 under the direction of the recording circuit 32.

An image signal 2a and an exposure output signal b are produced from the image sensor 2 as will be described below with reference to FIG. 3. A MOS type solid-state image sensor of an npn three-layer structure is sectioned at a photodiode, as shown in a model of FIG. 3. An $n^+$-type diffusion layer 101 and a p-type well 106 constitute the photodiode. A vertical gate line 102, the $n^+$-type diffusion layer 101 of the photodiode and a signal output drain 105 made of an $n^+$-type diffusion layer constitute a MOS transistor. This MOS transistor serves as a switch for delivering a negative charge stored in the $n^+$-type diffusion layer 101 to the outside of the image sensor through a vertical signal line 103.

When light coming into an oxide film 104 of $SiO_2$ in a direction of arrow 37 irradiates the np junction 101, 106 of the photodiode, electrons and holes are created in a pair and within the photodiode, the electrons stay in the $n^+$-type diffusion layer 101 and the holes stay in the p-type well 106. Under the application of a bias, the holes staying in the p-type well are drawn out of the sensor through a bias power supply 38. This output signal forms an exposure current Ip which is proportional to a quantity of light illuminating the sensor. Accordingly, by measuring the exposure current Ip by means of an exposure current detecting circuit 23, the quantity of the light incident to the image sensor 2 can be determined.

Even when the negative charge in the $n^+$-type diffusion layer 101 of the photodiode is not read out of the sensor so that it remains stored in the photodiode, photometry can be ensured using the exposure current Ip due to the outflow of the holes from the p-type well.

This electronic still camera has two modes of photometric operation. The first one is a storage mode. In the storage mode, the electric charge will not be read out of the $n^+$-type diffusion layer 101 during the detection of the exposure current Ip by the integration photometric circuit 22. The storage mode is suitable for still picture imaging or photographing. The second one is a read mode. In the read mode, the electric charge will be read out of the $n^+$-type diffusion layer 101 in parallel with the detection of the exposure current Ip by the integration photometric circuit 22.

Since the read mode photometry permits the production of the image signal during the photometric operation, the imager can be operated as a video camera for moving picture to ensure that an image being photographed can be displayed on the monitor even during the photometric operation. Therefore, the imager can be used as either a still picture camera or a moving picture camera through the use of the single image sensor.

A camera having a focal plane shutter is used for high-speed photography, whereby when a slit defined by a leading curtain and a trailing curtain runs over an image sensor, exposure is effected by light passing through the slit. In this type of camera, it is difficult for the storage mode photometry to measure a quantity of light incident to the entirety of the image sensor but contrarily it is possible for the read mode photometry to measure, in advance, a quantity of incident light irrespective of the shutter operation.

The storage mode photometry can facilitate the measurement of a quantity of light irradiated during an interval ranging from opening to closure of the shutter and so this mode is effective for Strobo-light photography in which the quantity of light before depression of the shutter is different from that after the shutter depression.

When the storage mode remains to cause continuous irradiation of light onto the sensor 2, the positive and negative charges in the photodiode of the sensor 2 naturally recombine together and as a result, the proportionality of the exposure current Ip to the incident light quantity is disturbed if the incident light quantity exceeds a dynamic range of the sensor. Practically, however, the image signal will be read out of the image sensor under an exposure condition which falls within the dynamic range and hence the iris value of the shutter 12 can be controlled within a range in which the exposure current Ip persists a linear characteristic, raising no serious problem.

Figure 3:
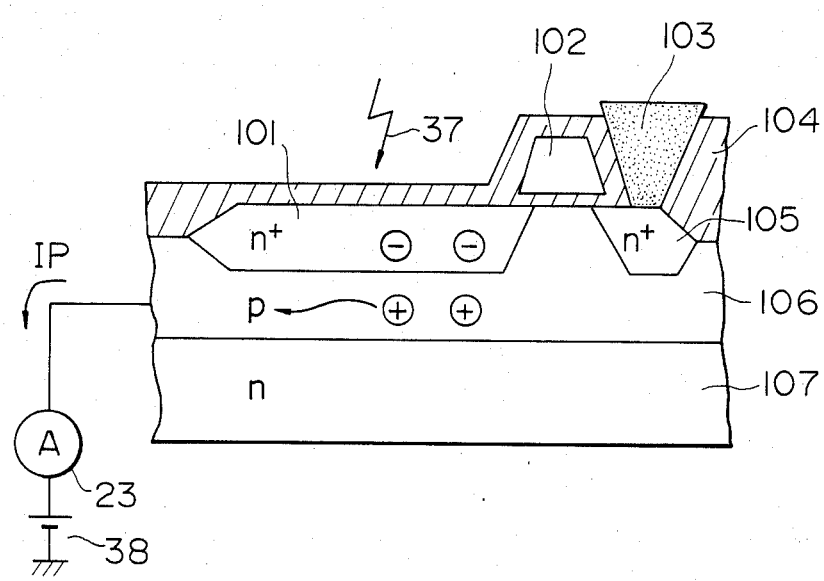
FIG. 3 is a sectional view of an image sensor (2).

In the example of FIG. 3 being of a vertical type overflow structure in which as the electrons fill up the $n^+$-type diffusion layer, surplus electrons are sucked by an n-type substrate 107, however, the change in linearity due to the recombination can practically be suppressed and usually no serious problem arises.

The read mode photometry can prevent the recombination of electrons and holes within the photodiode and so this mode is effective for an instance wherein no countermeasure against the overflow is provided as in the case of removal of the n-type substrate 107 from the FIG. 3 structure.

The photometry operation in either the storage mode or the read mode is effected with a practical image sensor as will be described below.

Figure 4:
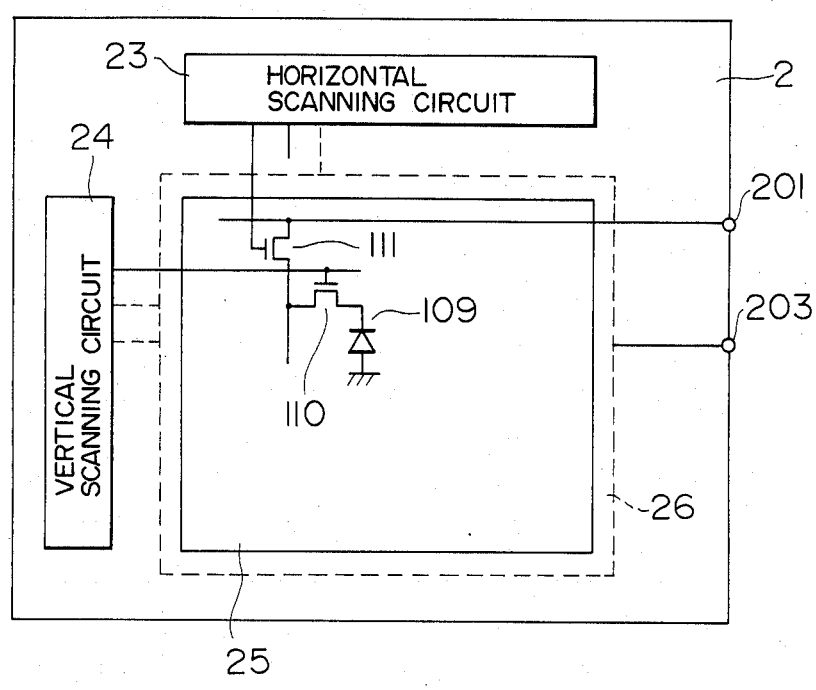
FIG. 4 is a plan view showing the construction of the image sensor.

FIG. 4 shows the internal construction of the sensor. The sensor 2 comprises a horizontal scanning circuit 23, a vertical scanning circuit 24, a photodiode array 25 including sets which are each comprised of photodiode 109 and MOS switches 110, 111 arranged in matrix, and a well 26 provided for the photodiode array.

In the storage mode photometry, the vertical scanning circuit 24 is stopped. More preferably, simultaneous stopping of the horizontal scanning circuit 23 can of course reduce generation of noise due to scanning.

Electrons stemming from photoelectric conversion of light incident to the sensor are stored in the $n^+$-type diffusion layer 101 of the photodiode 109. On the other hand, holes can be delivered out of the sensor through the terminal 203 connected to the well 26. By integrating the output signal from the terminal 203, a quantity of the total exposure onto the sensor can be measured.

In the read mode photometry, the vertical scanning circuit 24 and horizontal scanning circuit 23 are operated for scanning and the MOS switches 110 and 111 are turned on so that electric charge in the photodiode can sequentially be delivered out of the sensor through the terminal 201. Concurrently, an output current signal proportional to a quantity of light incident to the photodiode array 25 is delivered through the terminal 203 to the integration photometric circuit 22 which measures the output current to determine the quantity of the light incident to the sensor.

An imager according to a second embodiment of the invention will now be described with reference to FIGS. 5 and 6.

An electric still camera of this embodiment performs display, as necessary, during the read mode photometry to display a photometric value on a display unit 53.

Figure 5:
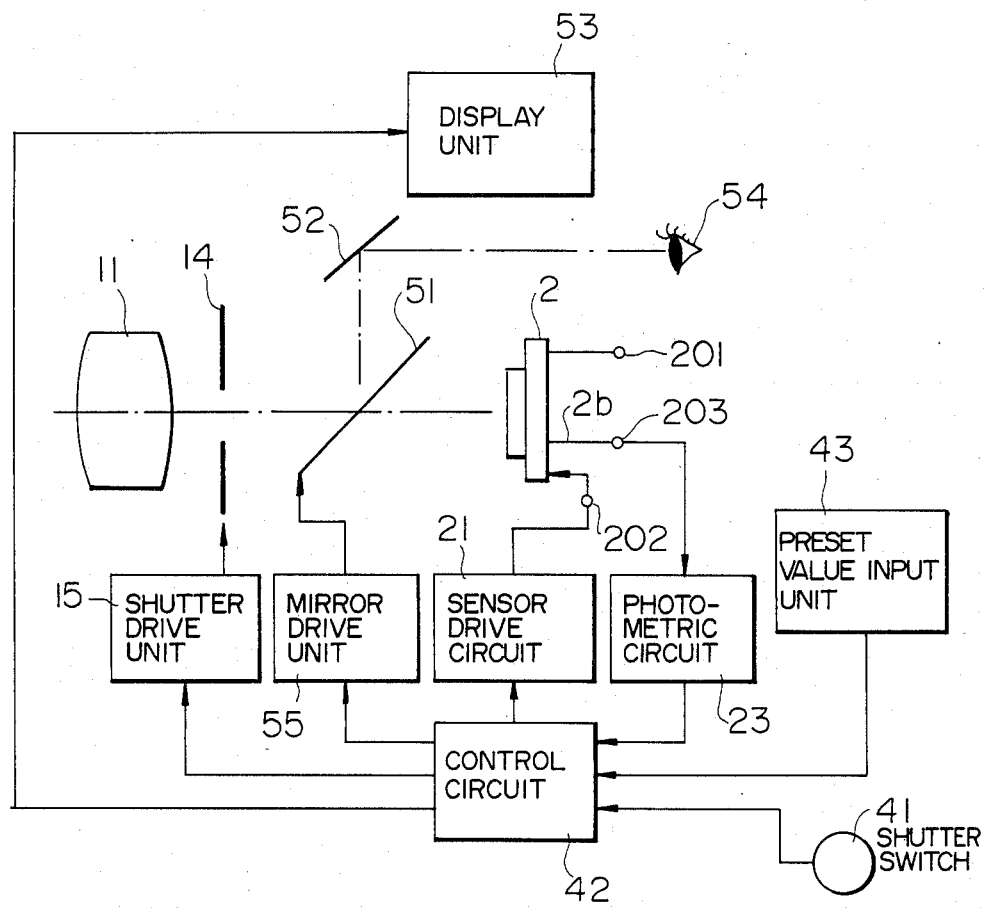
FIG. 5 is a block diagram illustrating an imager according to a second embodiment of the invention.

The electric still camera shown in FIG. 5 comprises a shutter 14 also serving as an iris, a shutter drive unit 15 for the shutter 14, a bounce-up half-mirror 51 through which part of incident light transmits, a reflector 52 incorporated in an optical viewfinder not shown, the display unit 53 for displaying a shutter speed or the like, a mirror drive unit 55 for bouncing up the bounce-up half-mirror 51, a photometric circuit 23 for measuring an optical output from the image sensor 2, a control circuit 42, and a preset value input unit 43 for inputting an iris value or the like. The recording section is not illustrated in FIG. 5.

The operation of the FIG. 5 electronic still camera will be described with reference to a flow chart of FIG. 6. As an example, in this embodiment, an iris preferential exposure control operation will be described wherein the shutter speed is calculated so as to be optimized for an iris value preset in the present value input unit 43 and then the shutter is opened.

Firstly, the shutter 14 is opened (step S6). A predetermined iris value has already been preset in the preset value input unit 43. Light transmitting through the bounce-up half-mirror 51 illuminates the image sensor 2. The image sensor 2 generates, as described with reference to FIG. 3, an exposure output proportional to a quantity of light incident to the image sensor 2 and an exposure current Ip from the p-type will 106 of the sensor is measured by the photometric circuit 23 to determine brightness of an object being imaged (step S7). Thereafter, the iris value preset in the preset value input unit 43 is fetched by the control circuit 42 (step S8) so that the control circuit 42 calculates a shutter speed from the preset iris value, sensitivity of the image sensor and measured brightness of the object (step S9), and the shutter speed is displayed on the display unit 53 (step S10). Structurally, the circuit for determining the shutter speed in the manner described above is similar to the exposure circuit of a 35 mm camera. The steps S7 to S10 are repeated until the shutter switch 41 is depressed.

Subsequently, when the shutter switch 41 is turned on (step S11), the shutter speed at that time is stored (step S12), the shutter 14 is closed and the bounce-up half-mirror 51 is bounced up by the mirror drive unit 55 (step S13), the image sensor 2 is reset by the sensor drive circuit 21 so that the reading of the sensor is stopped to undertake the storage mode (step S14). Thereafter, the exposure is carried out (steps S15 to S17).

Since the shutter 14 of the electronic still camera in this embodiment also plays the part of the iris, the shutter 14 is opened to an aperture corresponding to the iris value inputted to the preset value input unit and is kept opened during an interval of time corresponding to the shutter speed stored at the step S12. During this interval of time, the sensor 2 remains to be exposure to light. When it is decided that the interval of time corresponding to the shutter speed has expired following the opening of the shutter 14 (step S17), the shutter 14 is closed (step S18) and an image signal is read out of the image sensor 2 under the direction of the sensor drive circuit 21 so as to be delivered to the terminal 201. The image signal at the terminal 201 is recorded on the sheet 34 under the direction of the recording circuit 32 (step S19), the sheet 34 and recording circuit 32 similar to those in FIG. 5 not being illustrated in FIG. 5. Thereafter, the bounce-up half-mirror 51 is returned downwards or descended and the shutter 14 is opened (step S20), thus completing one photographing operation.

Resetting of the image sensor 2 at the step S14 can be effected in various ways and particularly, it can readily be accomplished by operating the horizontal and vertical scanning circuits 23 and 24 under the direction of the sensor drive circuit 21 to thereby read the electric charge stored in all of the photodiodes 109. Further, the image sensor 2 can be reset rapidly in a manner to be described later.

This embodiment has been described by way of the iris preferential type exposure control in which the preset iris value is inputted and the control circuit determines the shutter speed but obviously, it may also be applied to shutter speed preferential type or program type exposure control. For example, when a shutter speed is inputted to the preset value input unit, the control circuit 42 calculates an iris value corresponding to the preset shutter speed, the shutter 14 is opened to an aperture corresponding to the iris value and the image sensor 2 is exposed to light during an interval of time corresponding to the preset shutter speed. The program type exposure control is similar to that of the 35 mm camera and will not particularly be described herein. In this embodiment using the shutter and iris which is kept opened for passage of the light to the image sensor 2, the object can be checked for photometry by irradiating the light on both the optical viewfinder and image sensor through the bounce-up half-mirror which partially transmits the incident light. In such photometry, the shutter speed and the iris value should of course be determined by taking into consideration an increase in quantity of light which is due to the fact that the entire quantity of light passing through the shutter illuminates the image sensor 2 when the bounce-up half-mirror is bounced up.

Figure 7A:
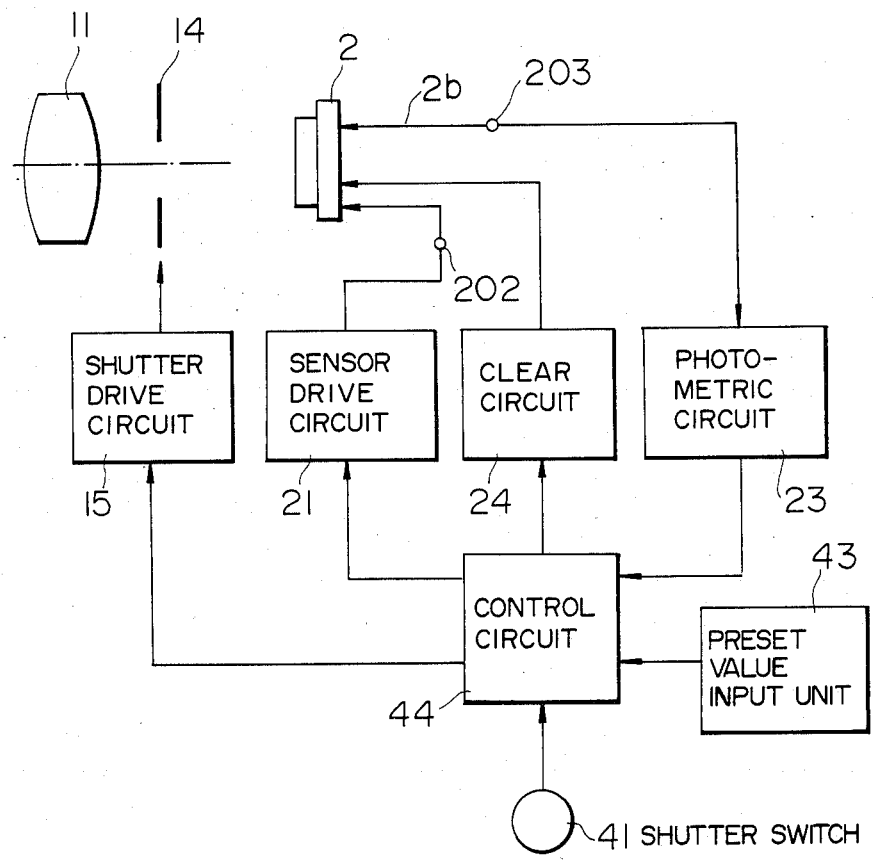
FIG. 7A is a block diagram illustrating an imager according to a third embodiment of the invention.

Although in this embodiment the image sensor is reset by temporarily closing the shutter and thereafter the exposure is effected by bringing the image sensor into the storage mode and opening the shutter also serving as the iris, the image sensor can be reset without performing the temporary closure of the shutter as will be described by referring to a third embodiment as shown in FIG. 7A.

In the third embodiment of the invention schematically shown in FIG. 7A, a control circuit 44 substitutes for the control circuit 42 of the electronic still camera shown in FIG. 5, a clear circuit 24 for clearing the image sensor 2 is added and the remaining blocks function in the same way as the blocks designated by like reference numerals in FIG. 5. In the FIG. 7A embodiment, the bounce-up half-mirror 51 and optical viewfinder 52 shown in the FIG. 5 embodiment are of no significance and therefore they are not illustrated. The operation of this embodiment will be described with reference to a flow chart of FIG. 7B in which steps like those of FIG. 6 are designated by like reference characters. When brightness of an object to be photographed is first measured by the photometric circuit 23, the control circuit 44 determines a shutter speed on the basis of an iris value preset in the preset value input unit 43.

When detecting the shutter switch 41 being depressed, the control circuit 44 causes the shutter drive circuit 15 to perform iris-out of the shutter and iris 14 to the preset iris value and concurrently the bounce-up half-mirror (not shown) is bounced up to permit light from the object to be irradiated on the image sensor 2 (step S21). Thereafter, signal charge stored in the image sensor 2 is entirely cleared by the clear circuit 24 (step S22). The clear operation will be described later. Immediately after the clearing, the image sensor 2 is started to undergo light exposure. When an interval of time corresponding to the shutter speed calculated in advance by the control circuit 44 has expired (step S17), the shutter 14 is closed to complete the exposure (step S18). After completion of the exposure of the image sensor 2, an image signal is read out of the image sensor so as to be recorded on the sheet, the bounce-up halfmirror 51 is descended and the shutter and iris 14 is opened, thus completing one photographing operation.

The image sensor 2 is cleared as will be described below. As an example, a way of clearing at a time the entire signal charge stored in the photodiode 109 of the image sensor 2 will be explained with reference to a model of FIG. 8A in which elements like those of FIG. 3 are designated by like reference numerals. In the model, there are seen a bias power supply 38a for the n-type substrate 107, a video bias power supply 38b for applying electric potential to the n+-type diffusion layer 101, and a resistor 38c through which a current passes to provide an image signal.

Figure 8A:
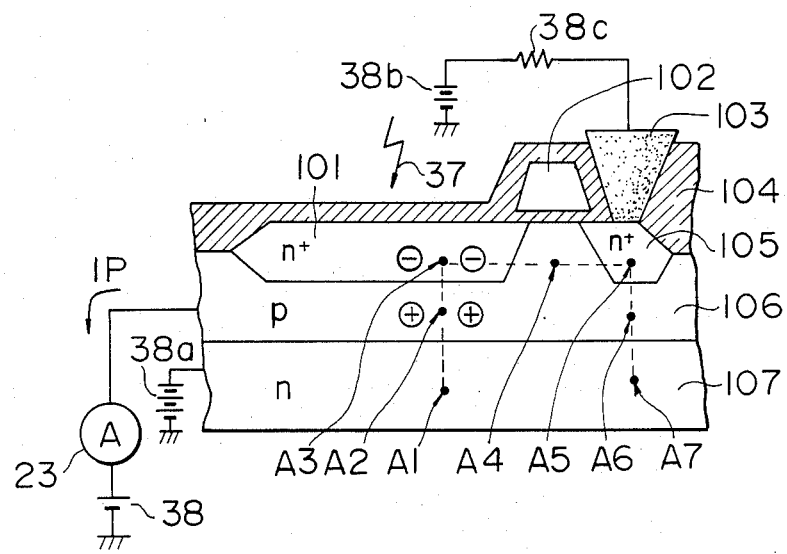
FIGS. 8A and 9 show partial sectional views of different image sensors which are useful in explaining the clear operation by a clear circuit (24).
Figure 8B:
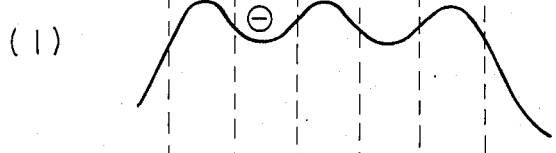
FIG. 8B is a graphic representation showing electric potentials at different points in the image sensor of FIG. 8A.
Figure 8B:
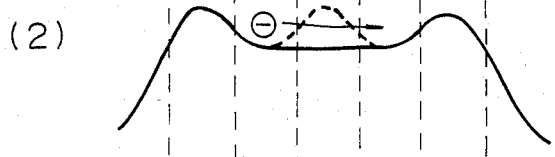
Figure 8B:
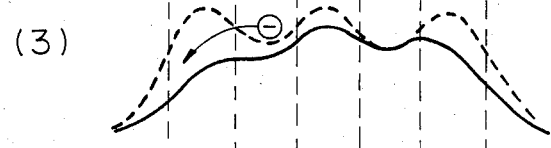
Figure 8B:
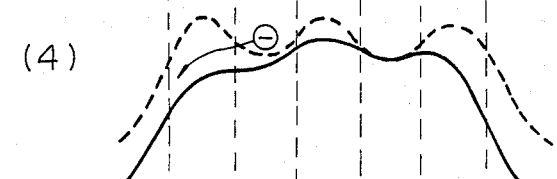
Figure 8B:
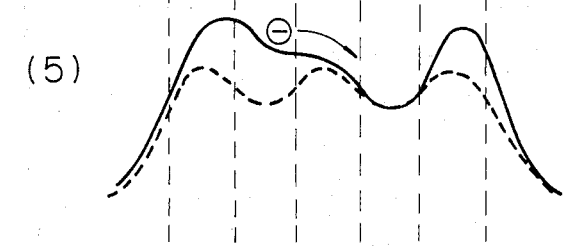

In the pn junction constituting the photodiode of the image sensor, the n+-type diffusion layer 101 is usually charged in accordance with the potential of the video bias power supply 38b through the vertical signal line 103 when the vertical gate line 102 is turned on. Since this potential is set to be higher than the bias power supply 38 for the p-type well 106, the spread of the depletion layer at the pn junction is increased with the result that the majority of electrons created by the incident light in a pair with holes are accumulated within the n+-type diffusion layer to provide storage electric charge due to the photoelectric conversion. The electric charge can be cleared as will be described below with reference to a model of FIG. 8B showing potential distributions near the photodiode. In particular, FIG. 8B illustrates changes in electric potential at points on dotted lines in FIG. 8A. The conductivity types, n-type and p-type, of the semiconductor points A1 to A7 in FIG. 8A are designated by N, P, N, P, N, P and N, respectively, in FIG. 8B.

FIG. 8B illustrates at section (1) a potential distribution affecting the electrons during the storage operation. The substrate bias power supply 38a, bias power supply 23 and video bias power supply 38b cooperate to apply potentials, positive, negative and positive in relative relationship, to the points $A_1$, $A_2$ and $A_3$ so that the pn junction is backwardly biased. Consequently, the electrons representative of the storage charge within the n+-type diffusion layer are accumulated at a potential valley, as shown at 38d.

FIG. 8B illustrates at section (2) a potential distribution during the read operation. When the vertical gate line 102 is turned on becoming positive, potential near the point $A_4$ in the p-type well 106 is decreased. Consequently, the electrons 38d are transferred to the point $A_5$ within the signal output drain 105 and read through the vertical signal line 102. The potential at the point $A_3$ is determined in accordance with a voltage applied to the signal output drain 105 at that time. For clearing, however, the read operation in this way is not performed but the electrons 38d are swept up from the n+-type diffusion layer. FIG. 8B illustrates at sections (3) to (5) changes in potential during the clear operation.

A way of clearing the electrons within the n+-type diffusion layer is to lower potential p-type well 106 relative to that of the n+-type diffusion layer 101 so that the electrons 38d within the n -type diffusion layer 101 may be drawn into the n-type substrate 107 through the p-type well 106 and swept up from the n-type substrate to the outside of the image sensor.

Specifically, the bias power supply 38, substrate bias power supply 38a and video bias power supply 38b - are adjusted in order that potential of the p-type well is set to be lower than that of the n+-type diffusion layer 101, thereby providing a potential distribution as shown at section (3) in FIG. 8B. Because of the potential of the p-type well 106 being lower than the same as shown at section (1) in FIG. 8B, the electrons within the n+-type diffusion layer can readily be drawn into the n-type substrate. Potential of the n+-type diffusion layer 105 biased by the video bias power supply 38b at that time remains unchanged and so potential at the point $A_4$ in the p-type well is sympathetically raised, thereby preventing the electrons within the n+-type diffusion layer 101 from being drawn into the n+-type diffusion layer 105.

A second way to sweep up the electrons within the n+-type diffusion layer 101 is to more deeply lower potential of the n-type substrate relative to that of the p-type well to conduct the electrons 38d within the n+-type diffusion layer 101 to the n-type substrate 107.

Specifically, the bias power supply 38, substrate bias power supply 38a and video bias power supply 38b are adjusted in order that potential of the n-type substrate 107 is set to be more deeply lower relative to that of the p-type well 106 and n+-type diffusion layer 101, thereby providing a potential distribution as shown at section (4) in FIG. 8B.

A third way of clearing is to make potential at the point $A_2$ in the p-type well 106 higher than that at the point $A_4$ in the p-type well 106, so that potential of the N+-type diffusion layer 101 is sympathetically raised relative to the potential at the point $A_4$ in the p-type well 106, thereby provided a potential distribution as shown at section (5) in FIG. 8B. Consequently the electrons 38d within the n+-type diffusion layer are once conducted to the n+-type diffusion layer 105 and then swept up to the outside of the sensor through the vertical signal line 103.

Figure 9:
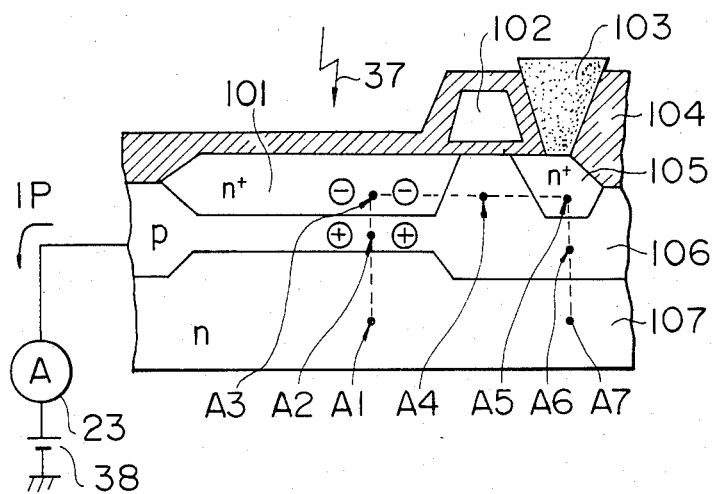

A model of image sensor as shown in FIG. 9 can facilitate the clear operation. In the sensor of FIG. 9, the thickness of the p-type well is made smaller at a portion which opposes the n+-type diffusion layer 101 to form the photodiode than at another portion which surrounds the signal output drain 105. Thanks to a short distance between the n+-type diffusion layer 101 and the n-type substrate 107, the migration of the electrons within the n+-type diffusion layer 101 into the n-type substrate 107 can be facilitated.

As described above, by adjusting the bias voltage for the p-type well 106, the entire signal charge within the photodiode can be cleared at a time. Of course, all the photodiodes can otherwise be cleared by turning on the horizontal and vertical gate lines at a time. By clearing the electric charge stored in the photodiode 109 at a time in the manner described above, the image sensor 2 can be reset within a short time while keeping the shutter opened.

While in the foregoing embodiment the image sensor 2 is used for photometry, the shutter speed is calculated in consideration of the preset iris value and stored, and thereafter the exposure is effected during an interval of time corresponding to the calculated shutter speed, the image sensor may obviously be used for direct photometry to effect exposure control.

Figure 10A:
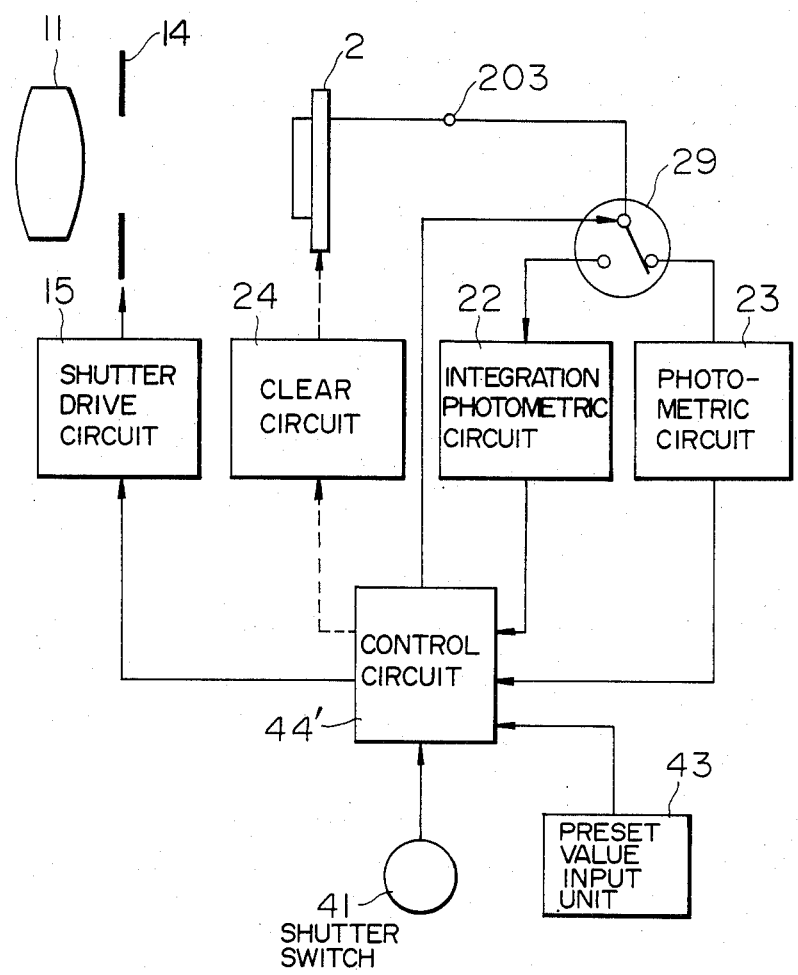
FIG. 10A is a block diagram illustrating an imager according to a fourth embodiment of the invention.
Figure 10B:
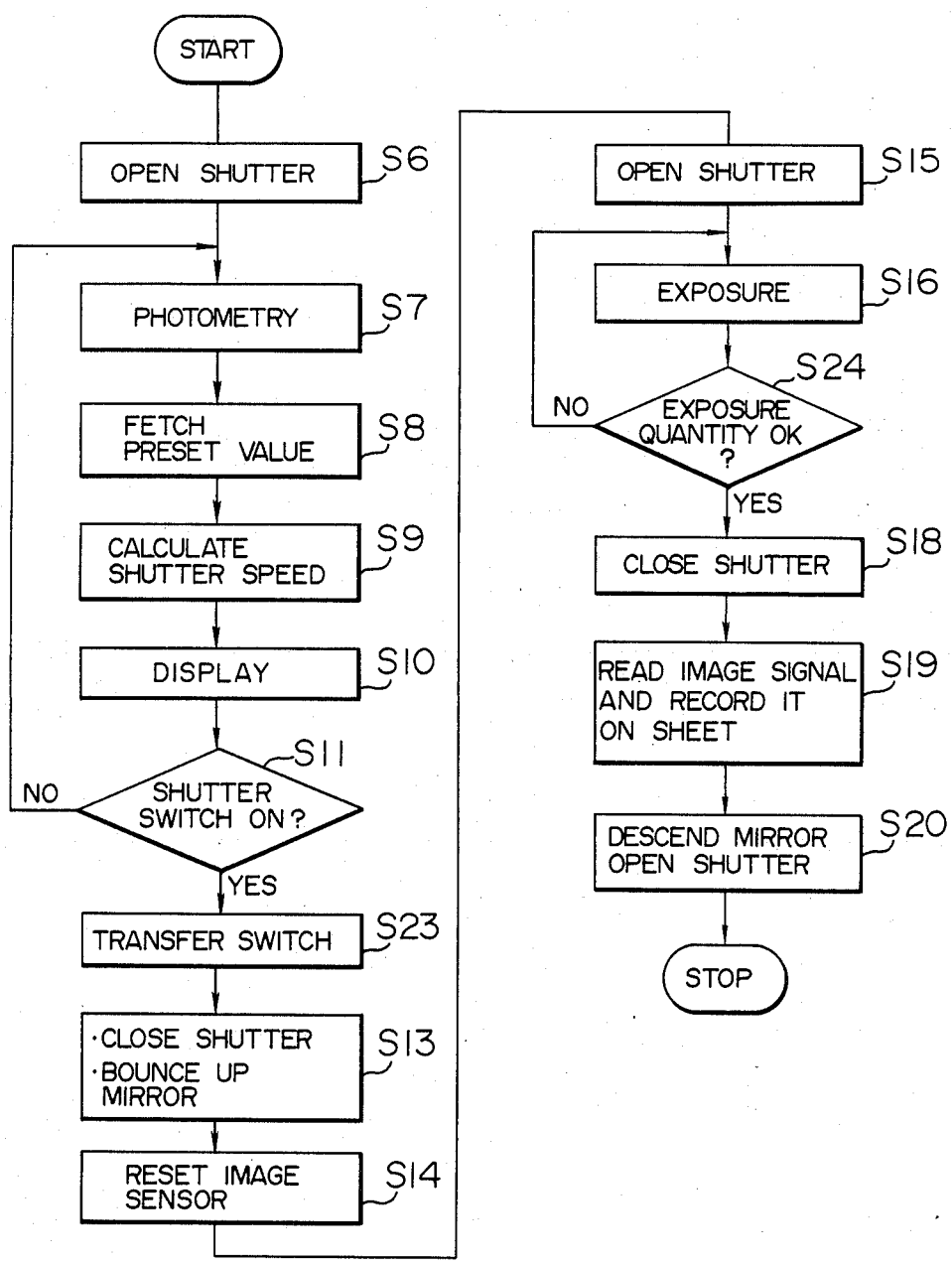
FIG. 10B is a flow chart illustrative of the operation of the FIG. 10A imager.

A fourth embodiment of the invention is achieved in this respect and will be described with reference to FIGS. 10A and 10B. The embodiment of FIG. 10A is identical with the FIG. 7A embodiment with the only exception of a control circuit 44' and a switch 29. Before the shutter switch 41 is turned on, the switch 29 is transferred to the photometric circuit 23 as illustrated in FIG. 10A whereby brightness of an object to be photographed is measured in the read mode by means of the photometric circuit 23, the control circuit 44' calculates a shutter speed or an exposure amount on the basis of a signal from the preset value input unit 43 and a signal from the photometric circuit 23, and the calculated shutter speed or exposure amount is displayed on the display unit not shown (steps S7 to S10 in FIG. 10B). The operation throughout the steps S7 to S10 is the same as that in the second embodiment. After the shutter switch 41 is turned on, the switch 29 is transferred to the integration photometric circuit 22 (step S23), and the shutter and iris is closed and the bounce-up half-mirror is bounced up (step S13). The exposure amount or the like displayed on the display unit at that time is held. After disappearance of the light incident to the image sensor 2, signal electric charge within the photodiode is reset for reading (step S14). Thereafter, as in the case of the first embodiment, the shutter and iris 12 is opened to an aperture corresponding to the preset iris value and exposure is started. Concurrently, an exposure output from the image sensor is integrated by the integration photometric circuit 22. When the exposure amount reaches a predetermined value (step S24), the shutter and iris is closed, thus completing the exposure (step S18). Thereafter, an image signal is read out of the image sensor 2 so as to be recorded on the sheet, the half-mirror is descended and the shutter and iris is opened, thus completing one photographing operation. Concurrently, the switch 29 is rendered ready for the next operation by being transferred to the photometric circuit 23.

Figure 6:
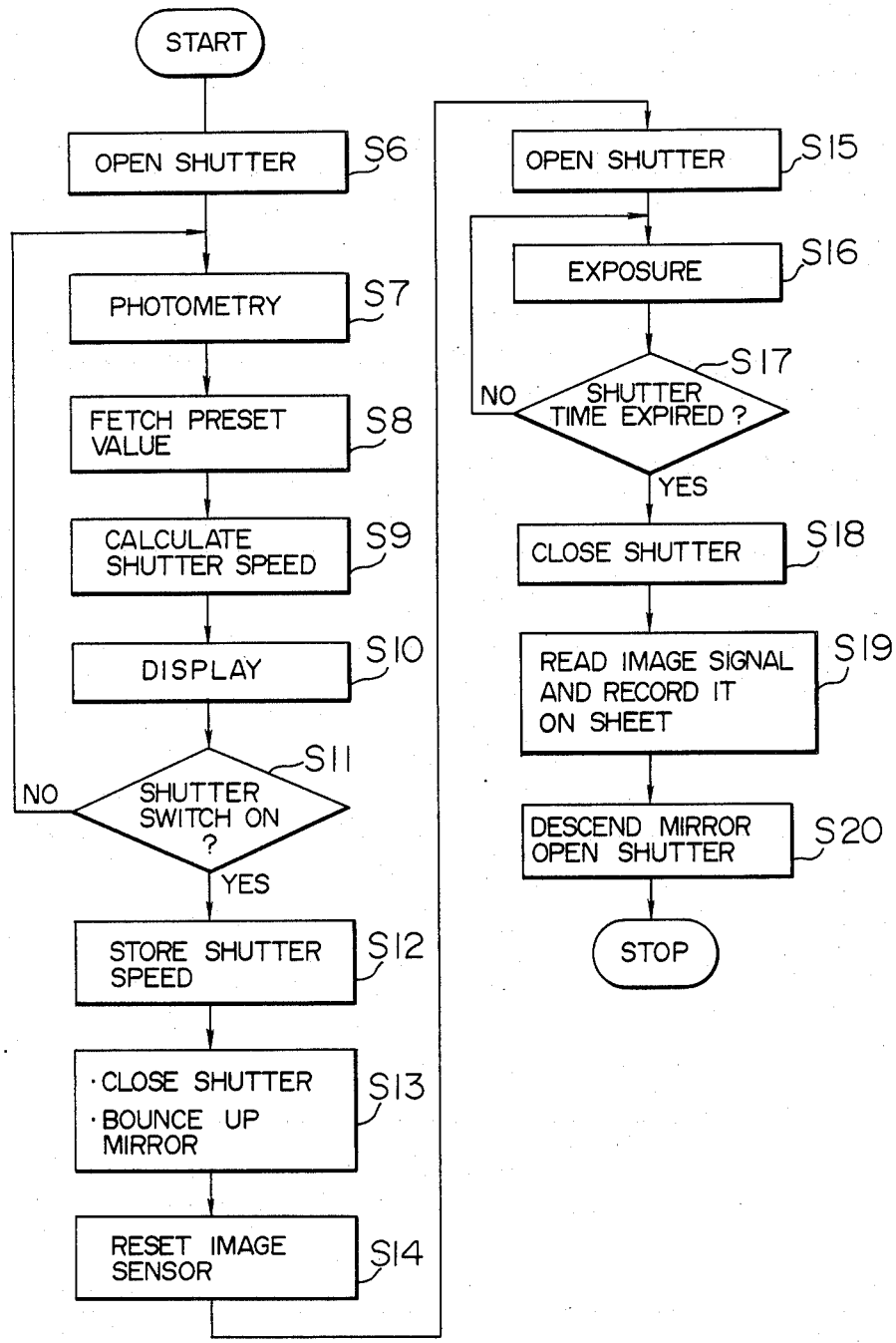
FIG. 6 is a flow chart illustrative of the operational flow in the FIG. 5 imager.
Figure 7B:
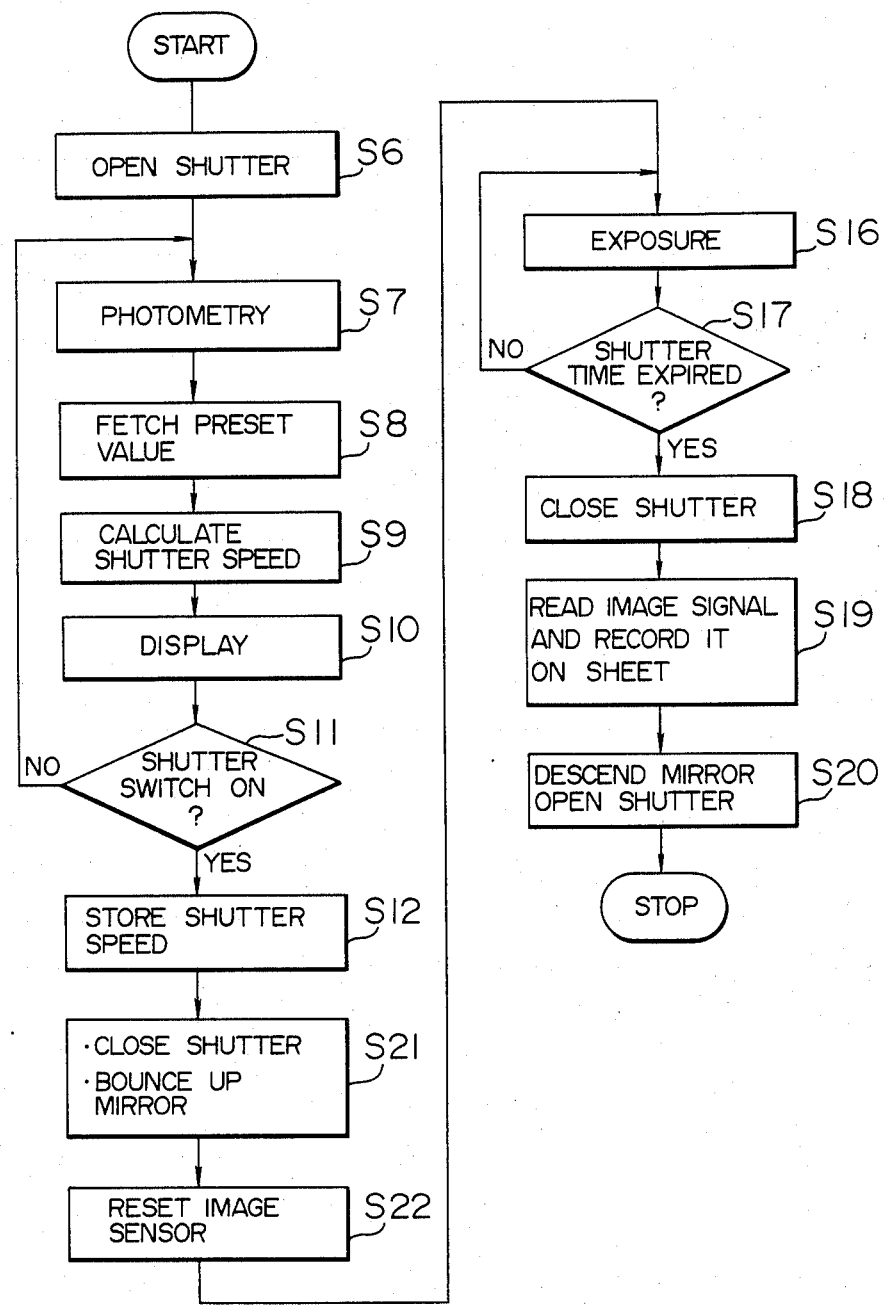
FIG. 7B is a flow chart illustrative of the operational flow in the FIG. 7A imager.

In this embodiment, the clear circuit 24 may be provided, as in the case of the FIG. 7 embodiment, for eliminating the shutter open operation at the step S15 in FIG. 6.

The fourth embodiment is thus featured in that the exposure is effected through the direct photometry in which the measurement value to be displayed on the viewfinder is obtained by calculating the exposure output signal from the image sensor on the basis of the output signal from the photometric circuit 23 comprised of, for example, a logarithmic amplifier and the preset value and after the depression of the shutter switch, the photometry is performed by means of the integration photometric circuit 22 adapted to integrate the exposure output signal from the image sensor and the exposure is stopped when the integration output signal reaches a predetermined value. In other words, the two photometric circuits 22 and 23 are properly used for display and exposure control.

Obviously, this feature may be applied to the Strobolight photography. For example, Strobo light is flashed under a condition that the image sensor is reset or cleared and the shutter and iris is concurrently opened and the flashing is stopped to complete exposure when the direct photometry output signal, i.e., the output signal from the integration photometric circuit 22 reaches a predetermined value.

The foregoing embodiments have been described by referring to the electronic still camera having the shutter also playing the part of the iris but the invention is applicable to an electronic still camera having separate iris and shutter.

Figure 11:
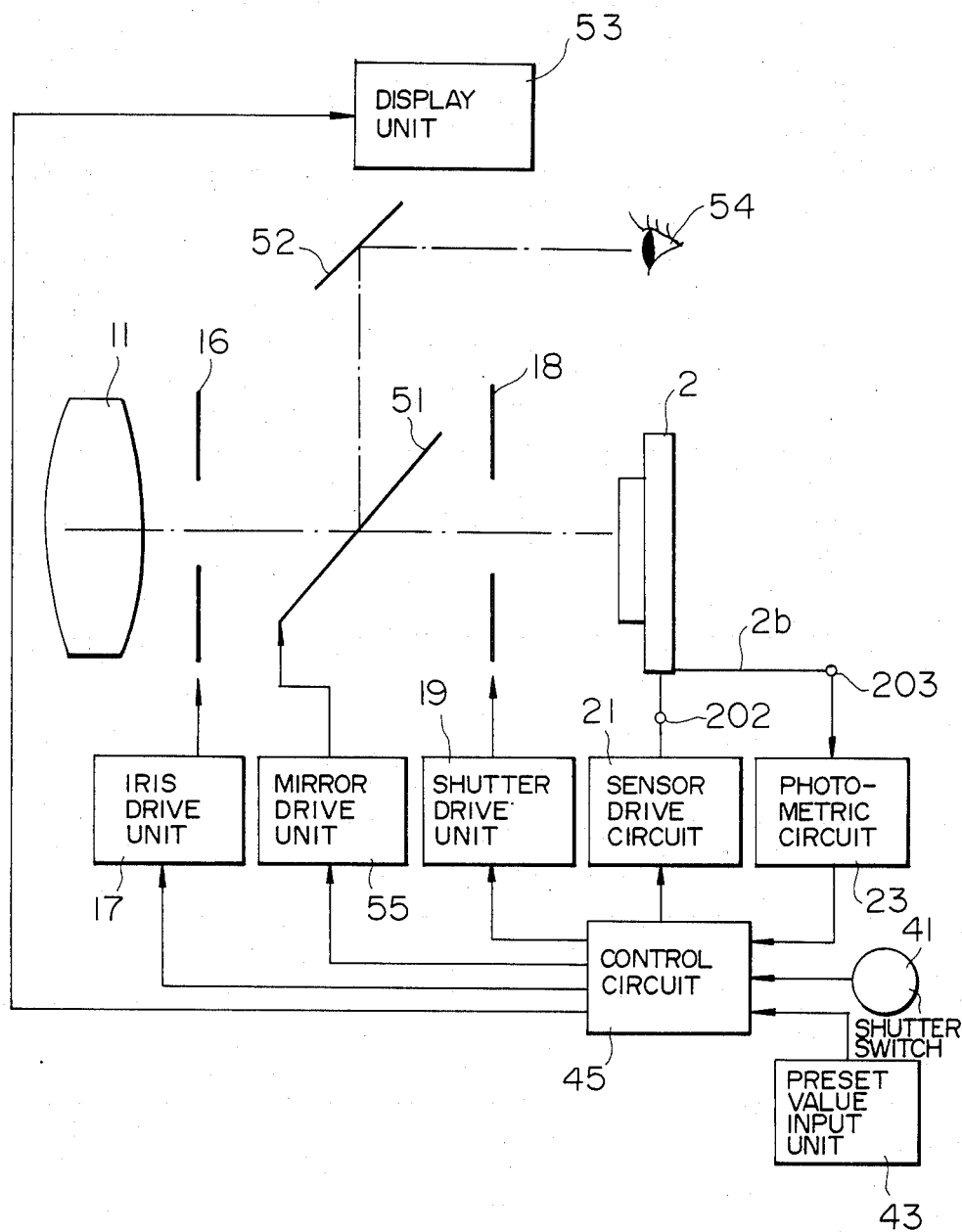
FIG. 11 is a block diagram of an imager according to a fifth embodiment of the invention.
Figure 12:
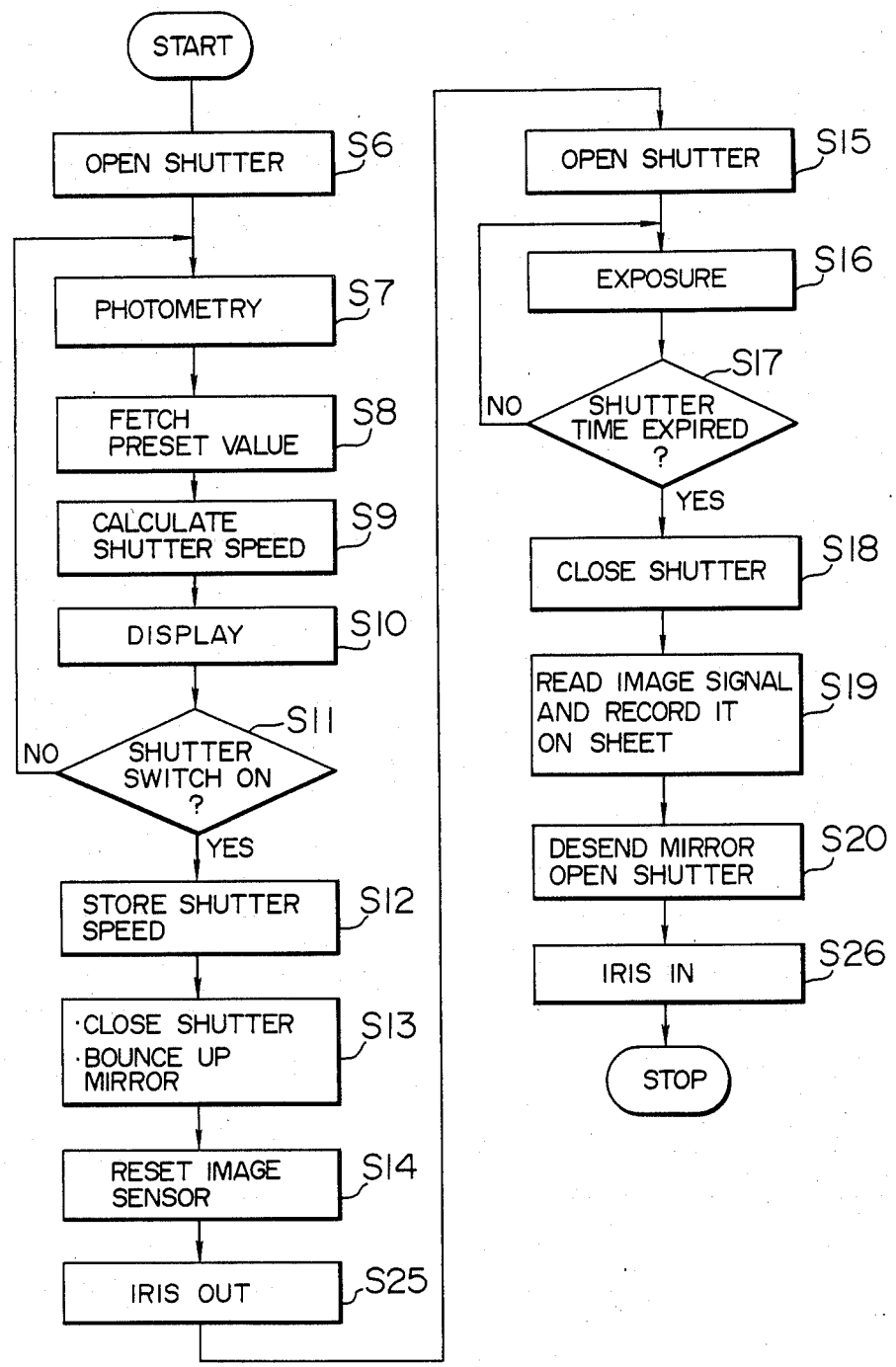
FIG. 12 is an operational flow chart for the FIG. 11 imager.

A fifth embodiment of the invention directed to an electronic still camera having independent iris and shutter will now be described with reference to FIG. 11. In the embodiment of FIG. 11, there are newly provided a iris 16, an iris drive circuit 17, a shutter 18, a shutter drive circuit 19 and a control circuit 45. The operation of this embodiment will be described with reference to a flow chart of FIG. 12. It is assumed that before starting, the shutter 18 and iris 16 are opened and the bounce-up half-mirror 51 is descended. Firstly, since light is permitted to illuminate the image sensor 2, brightness of an object to be photographed is measured by the photometric circuit 23 in the read mode photometry (step S7). Subsequently, a value calculated in accordance with a preset value is displayed on the viewfinder (step S10). After the shutter switch is turned on (step S11), the iris 16 undergoes iris-out until the preset value (step S25) and the bounce-up half-mirror 51 is bounced up (step S13). Then, the shutter 18 is closed to intercept the light incident to the image sensor 2 (step S13). After the image sensor 2 is reset to establish the storage mode, the shutter 18 is opened for a time calculated by the control circuit 45 to thereby effect exposure (steps S15 to S18). Thereafter, an image signal is read out of the image sensor 2 so as to be recorded on the sheet not shown (step S19). The bounce-up half-mirror is descended and the iris and the shutter are opened, thus completing one photographing operation (steps S20 and S26).

This embodiment is similar to the second embodiment shown in FIG. 5 in that the exposure control is effected after the image sensor 2 is reset following the interception of the light incident to the image sensor 2 but obviously, the direct photometry may be applied to the FIG. 11 embodiment. With the focal plane shutter, however, the shutter aperture takes the form of a slit when the high-speed shutter is operated and the accuracy of integration photometry based on the image sensor 2 tends to be degraded. Accordingly, the direct photometry is suitable for the Strobo-light photography and the low-speed shutter.

As is clear from the foregoing description, the photometry according to the invention is effected by measuring the current due to holes created in the p-type well of the photodiode to thereby measure the quantity of light incident to the image sensor and consequently, the reading of the image signal and the photometry operation will not affect mutually to ensure that the image output can be obtained even during the photometry operation.

This also makes it possible to take a moving picture at proper exposure by effecting closed-loop control for the iris with a video signal in the read mode. This photographic mode for obtaining an image signal representative of a moving picture by using the image sensor of the electronic still camera will hereinafter be called a video mode.

Figure 13:
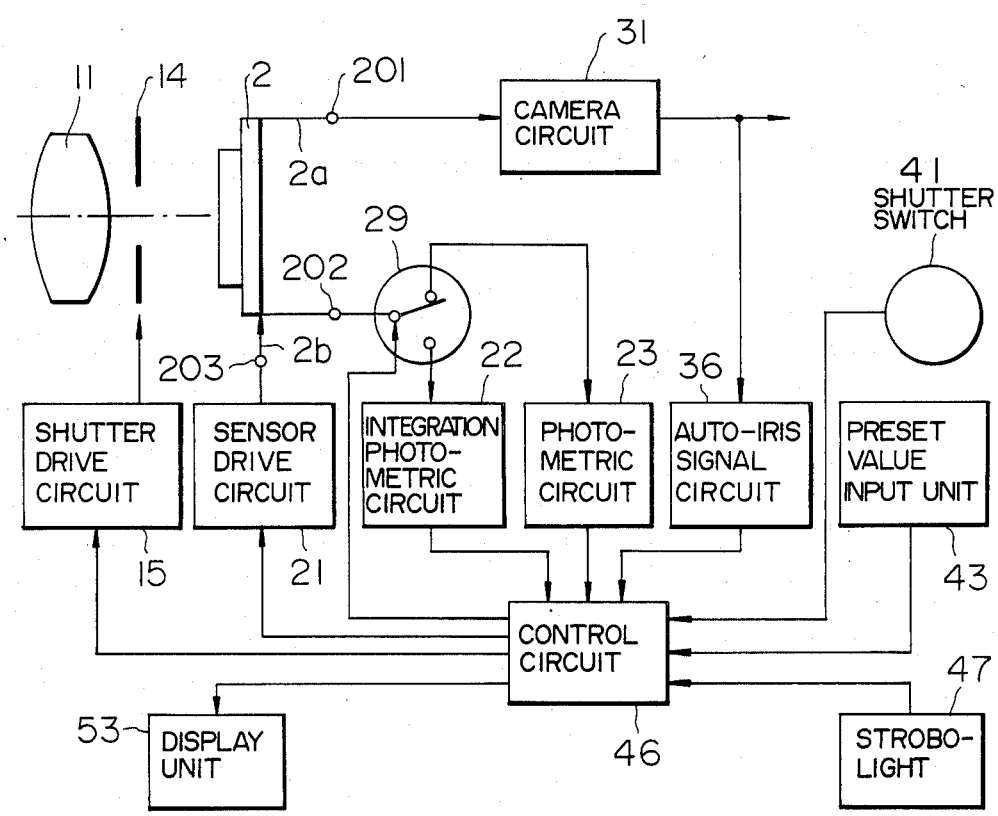
FIG. 13 is a block diagram illustrating an imager according to a sixth embodiment of the invention.

Shown in FIG. 13 is a sixth embodiment of the invention in which the invention is applied to an electronic still camera capable of video mode photography. Essentially, this embodiment comprises an automatic iris signal circuit 36 in addition to the circuit components of the FIG. 10A embodiment.

Figure 14:
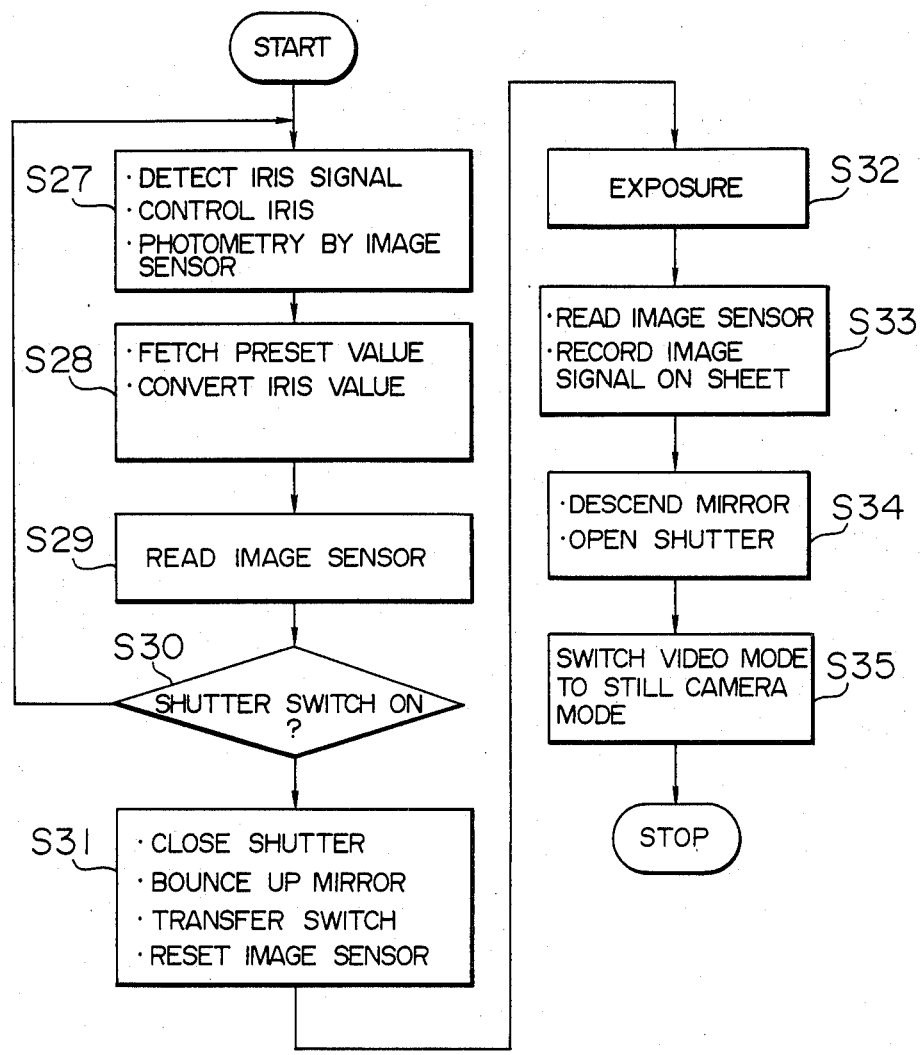
FIG. 14 is an operational flow chart for the FIG. 13 imager.

The operation of the sixth embodiment will be described with reference to a flow chart of FIG. 14.

Assume that the image sensor 2 is driven in the read mode under the direction of the sensor drive circuit 21. Then, the camera circuit 31 (image signal processing circuit) produces a video signal to which the automatic iris circuit 36 responds to produce an iris signal.

The shutter and iris 14 is subjected to closedloop control in accordance with the iris signal to operate in auto-iris fashion (step S27). A shutter speed is calculated on the basis of an iris value determined by the auto-iris circuit, a signal from the photometric circuit 23 and representative of brightness of an object to be photographed and a signal inputted to the preset value input unit 43, and the calculated shutter speed is displayed on the display unit 53 (step S28). Subsequently, electric charge is read out of the n+-type diffusion layer of the photodiode, thus producing a video output signal (step S29). In the video mode, the steps S27 to S29 are repeated to continuously deliver image signals, thereby providing a moving picture output signal.

The video mode can be switched to the still camera mode by simply depressing the shutter button (step S35). When the shutter switch is turned on (step S29), the shutter 14 is closed, followed by the previously-described still camera mode operation including the resetting of the image sensor 2, the exposure and so on (steps S31 to S34).

The image sensor will have a construction as described below for the sake of performing weighed or divisional photometry such as center preferential photometry and partial photometry in accordance with the invention.

Usually, in taking pictures, an object is often photographed with the objected viewed in the middle of the viewfinder. Accordingly, the center preferential photometry will often be employed wherein light from the central part of the viewfinder is preferentially measured. In some applications, weighted photometry will be employed wherein beams of light from various points on the viewfinder are fetched, weighted with predetermined values and added together to provide a quantity of incident light.

Considering that the quantity of incident light is measured by measuring the hole current drawn out of the p-type well of the photodiode in accordance with the invention, the weighted photometry can readily be accomplished by dividing the p-type well into some regions and measuring hole currents drawn out of individual divisional regions.

Figure 15A:
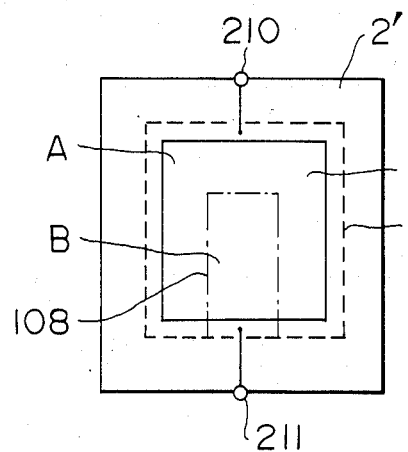
FIGS. 15A, 15B, 15C, 15D, 16A, 16B, 17A, 17B, 18A, 18B, 18C, 19A, 19B, 19C, 20A, 20B, 21A and 21B illustrate various division patterns for a p-type well of the image sensor.
Figure 15B:
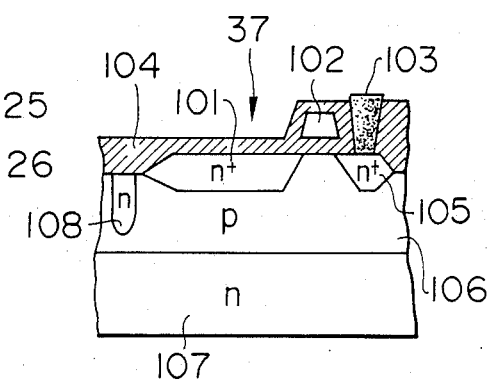

FIGS. 15A to 15D illustrate different constructions of the image sensor based on the p-type well division and suitable for the weighed photometry. FIG. 15A illustrates, in plan view, an image sensor with p-type well division and FIG. 15B is a partial sectional view of the FIG. 15A image sensor. A p-type well 26 of the photo-diode is divided by an n-type diffusion layer 108 into two divisional regions A and B. The divisional regions A and B of the p-type well are respectively connected with electrodes 210 and 211. By applying a bias voltage between each of these electrodes and the substrate 107, hole currents generated in the divisional regions can be swept up to the outside of the photodiode.

Accordingly, quantities of light illuminating the divisional regions can be known by measuring currents flowing through the electrodes 210 and 211. The thus known quantities of light are weighted and added together to provide a weighted (or divisional) photometry output signal.

Figure 15C:
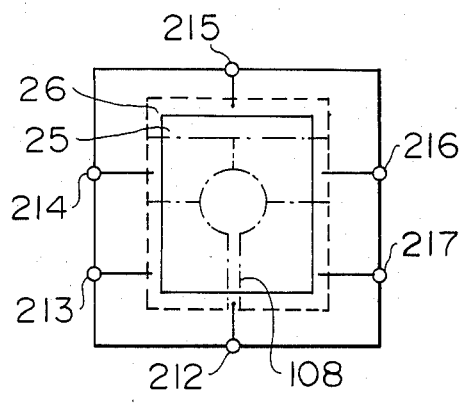
Figure 15D:
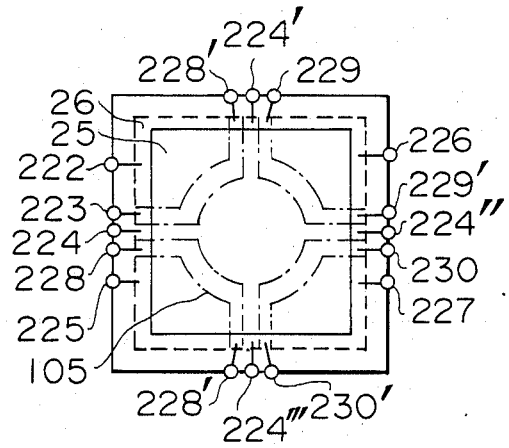

FIG. 15C shows another divisional pattern in which hole currents generated in individual divisional regions are drawn through electrodes 212 to 217. FIG. 15D shows still another divisional pattern in which hole currents generated in individual divisional regions are drawn through electrodes 222 to 230, 228', 229', 230', 224', 224" and 224'".

Figure 16A:
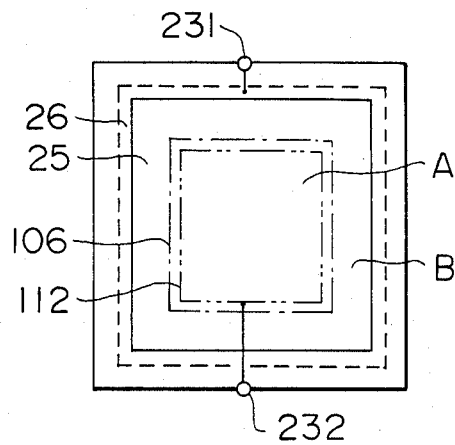
Figure 16B:
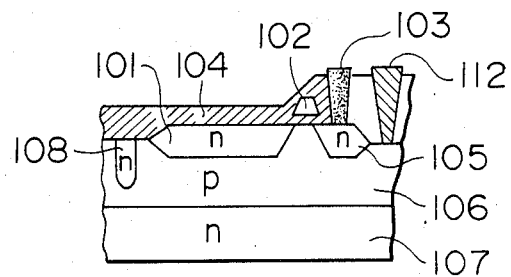

In the embodiments of FIGS. 15A to 15D, the exposure output signal is drawn through the well 106 but it can also be drawn through, for example, a newly added aluminum wiring as shown in FIGS. 16A and 16B. A chained line 112 denotes an exposure output line laid on the sensor surface and one end of the exposure output line is connected as shown in FIG. 16B to the p-type well 106. The remaining portions are identical to those of FIG. 15B. Current due to holes created within the p-type well is drawn to aluminum wiring 112 under the application of a bias voltage across the aluminum wiring 112 and the n-type substrate 107. The n-type diffusion layer 108 prevents the holes created in the photodiode from migrating to the left in FIG. 16B. The n-type diffusion layer 108 is essentially adapted to divide the p-type well but as shown in FIG. 16B, it protrudes deeply into the p-type well to form a pn junction. If such a protruding layer is otherwise provided near the exposure signal line 112, it would be difficult for the electric charge to reach the exposure signal line 122. For this reason, the n-type diffusion layer 108 is located remote from the exposure signal line 112.

As shown in FIG. 16A, the n-type diffusion layer 108 divides the photodiode area 25 into two regions A and B from which exposure output signals are drawn through terminals 232 and 231.

Figure 17A:
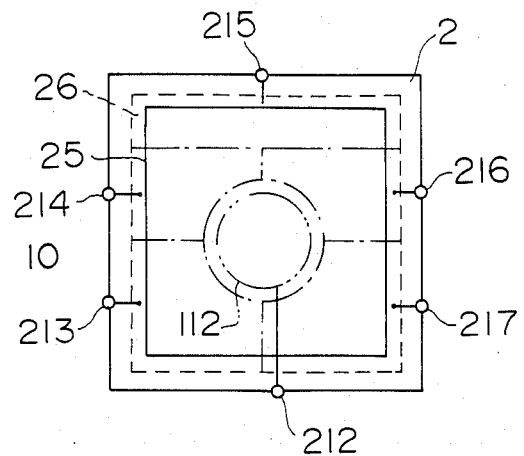
Figure 17B:
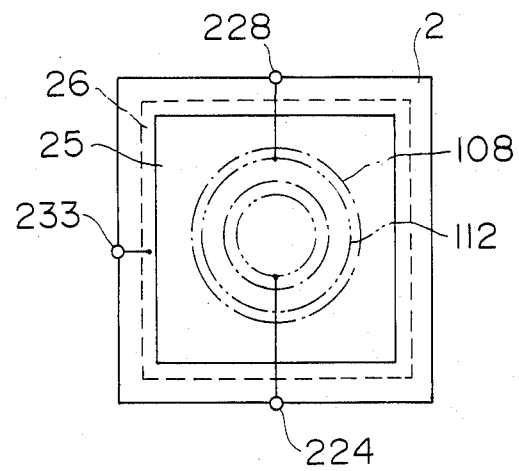

FIGS. 17A and 17B illustrate further embodiments of the divisional pattern. In FIG. 17B, reference numeral 233 denotes a terminal.

In the embodiments of FIGS. 16A to 17B, the exposure output line 112 is wired to surround the divisional region but alternatively, it may obviously make contact to the divisional region at one or several points.

Figure 18A:
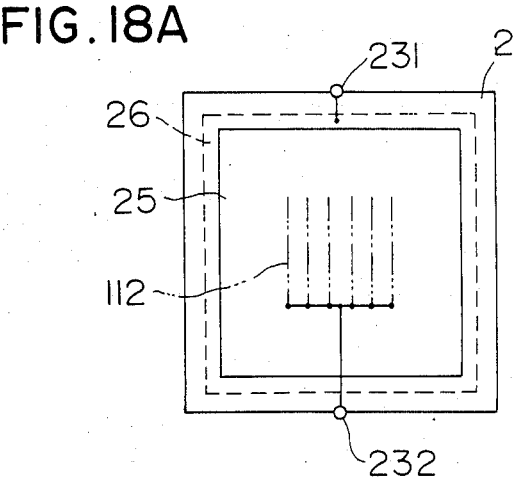
Figure 18B:
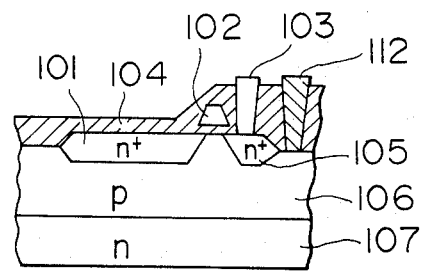
Figure 18C:
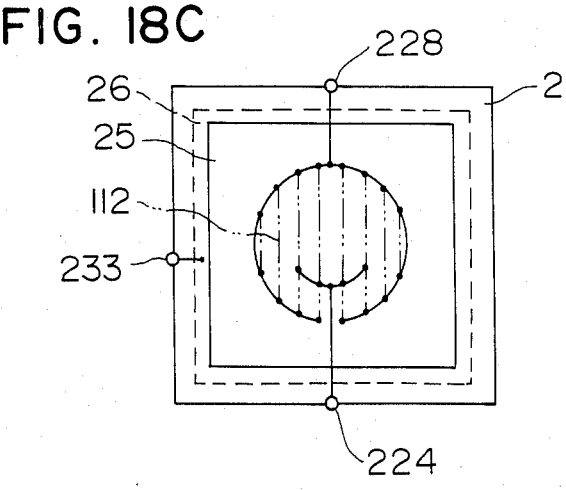

FIGS. 18A and 18B illustrate another type of division of the image sensor according to the invention. In this embodiment, the n-type diffusion layer 108 used for trapping the holes in the embodiments of FIGS. 15A to 17B is removed and the exposure signal line 112 is patterned such that the electric charge within the p-type well 106 can be directly drawn out of the image sensor 2 through the exposure signal line 112. In this embodiment, the exposure output signal can be delivered from desired portions of the photodiode array 25 of the image sensor 2. The embodiment of FIGS. 18A and 18B can be modified as shown in FIG. 18C to make correspondence to the FIG. 17B embodiment.

In the sensor division described above, the photodiode array is applied with working in various ways but the weighted photometry can also be realized by changing the conductance distribution of the p-type well.

Figure 19A:
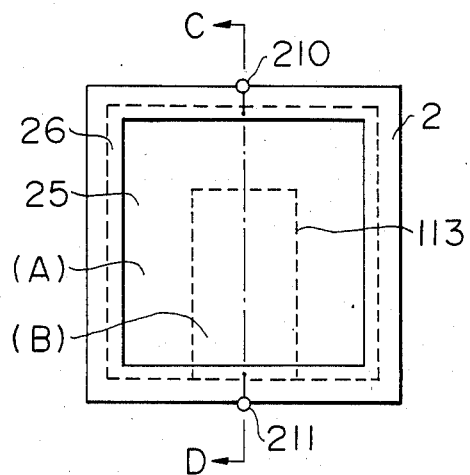
Figure 19B:
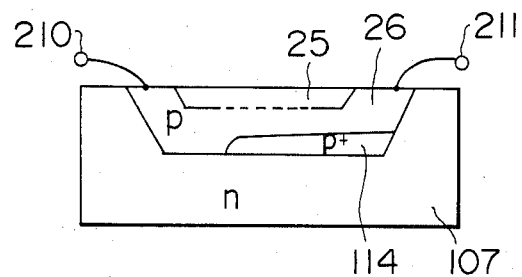
Figure 19C:
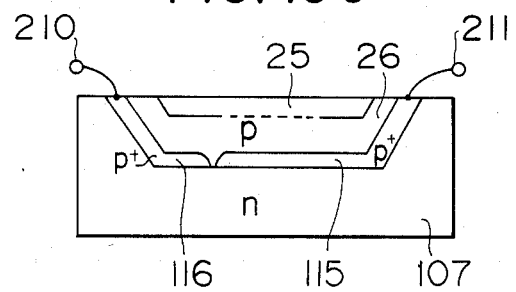

FIGS. 19A and 19B show an embodiment in this respect. In an image sensor as shown in FIG. 19A, the amount of implanted p-type semiconductor is changed within a region defined by a dotted line 113. FIG. 19B is a sectional view taken on chained line CD of FIG. 19A. The embodiment of FIGS. 19A and 19B can be modified as shown in FIG. 19C. In regions 114, 115 and 116 shown in Figs. 19B and 19C, the amount of p-type semiconductor implanted into the p-type well 26 is changed to form p+-type layers which have a conductance different from that of the p-type well 26.

In the p-type well 26 shown in FIG. 19B, electric charge generated by light exposure to the photodiode overlying the p+-type layer 114 is partly delivered to the outside through the terminal 211 and partly delivered to the outside through the terminal 210. The embodiment of FIG. 19C having the p+-type layers 115 and 116 is more efficient to conduct the electric charge to the outside, thereby facilitating delivery of exposure output signals from divisional regions in the photodiode. The boundary between the p-type well and each of the p+-type layers 114, 115 and 116 is depicted distinctively, indicating that the amount of implantation changes abruptly at the boundary. Obviously, however, the amount of implantation may be changed gradually.

The delivery of holes from the photodiode is distinctively separated near a position where the p+-type layer is located in the embodiments of FIGS. 19A to 19C but a predetermined photometric sensitivity distribution as needed for the center preferential photometry can also be established. An embodiment to this effect will be described with reference to FIGS. 20A and 20B.

Figure 20A:
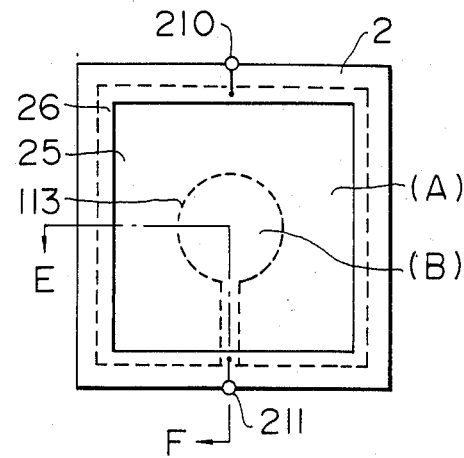
Figure 20B:
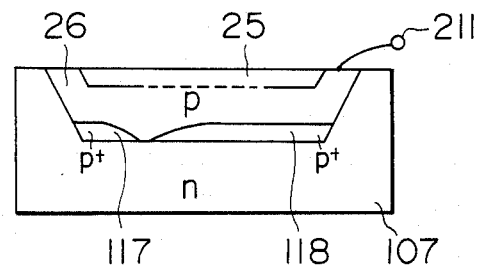

Essentially, in the embodiment of FIGS. 20A and 20B, a p+-type layer having a continous distribution of the implantation amount is formed in the p-type well 26 to provide a photometric sensitivity distribution. FIG. 20B is a sectional view taken on line EF of FIG. 20A. In p+-type layers 117 and 118 shown in FIG. 20B, the distribution of the amount of implantation is gradually changed, the change being modeled in terms of a change in the thickness of the p+-type layers. To increase intimacy with the terminal 211, the p+-type layer may obviously be distributed such that it rises along the p-type well as shown in FIG. 19C.

Figure 21A:
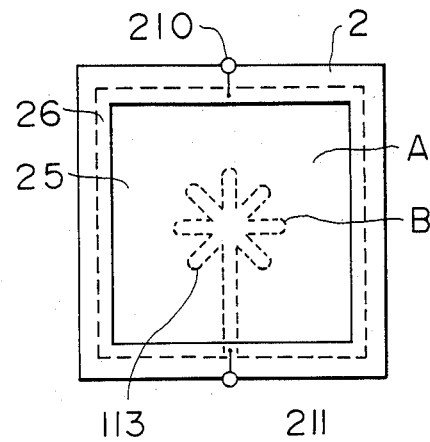
Figure 21B:
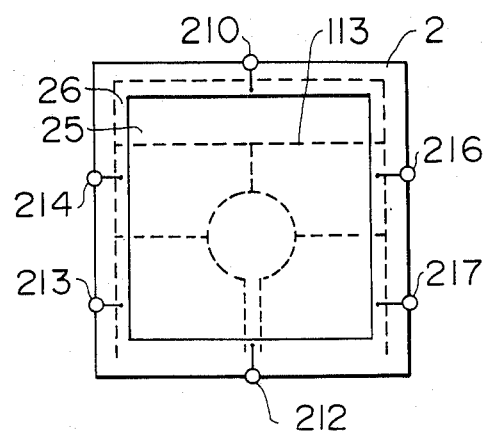

While in the embodiment of FIGS. 20A and 20B the implantation amount distribution is changed, the implantation may obviously be patterned so as to meet the center preference as illustrated in embodiments of FIGS. 21A and 21B. The implantation amount may be controlled such that it abruptly changes at the boundary as in the case of the FIG. 19C embodiment. The embodiment of FIG. 21B is patterned in correspondence to the divisional pattern in the FIG. 15C embodiment.

Obviously, the division and the patterning may take various forms other than the forms described in connection with the previous embodiments of FIGS. 15A to 21B.

Due to the fact that the principle of the invention resides in that the photometry is effected by measuring the amount of electric charge (hole charge) created in a pair with electric charge (electrons) stored in the photodiode, the image sensor exemplified as the MOS type image sensor in the embodiments described so far may be materialized by another type of image sensor such as a CCD type image sensor. Further, the electrons may be delivered as an exposure output signal by replacing the previously-described npn-type MOS image sensor with a pnp-type MOS image sensor.

Figure 22:
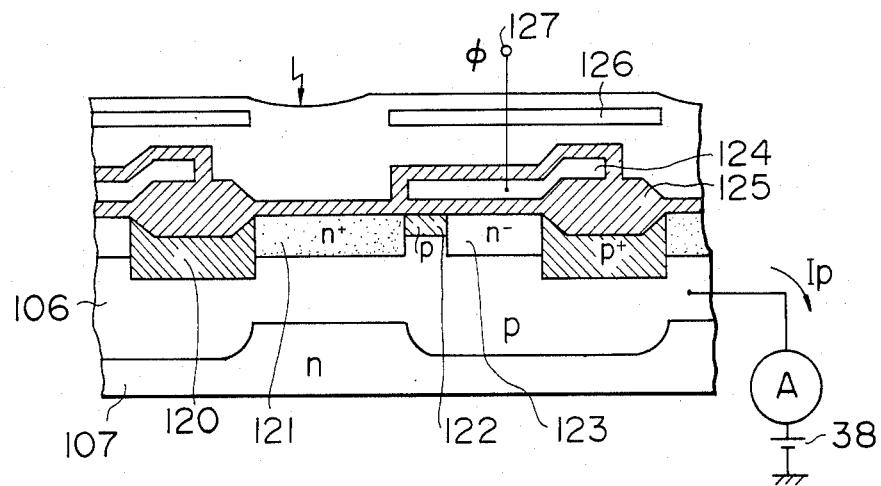
FIG. 22 is a partial sectional view of a CCD image sensor used in a CCD imager to which the invention is applied.

FIG. 22 shows an embodiment in which the invention is applied to a CCD type image sensor. A CCD image sensor illustrated, in partial sectional form, in FIG. 22 is equivalent to a unit pixel element of a CCD image sensor described in an article entitled "Vertical Type Overflow Structure CCD Image Sensor" reported by Ishihara et al in Trans. The Institute of Television Engineers of Japan, Vol. 37, No. 10, 1983. The CCD image sensor shown in FIG. 22 comprises a p-type well 106, an n-type substrate 107, a channel stop 120, an n+-type diffusion layer 121 for a pn junction constituting a photodiode of the image sensor (for convenience of explanation, the photodiode being represented by the layer 121), a transfer gate 122, an n−-type layer 123 (for convenience, a vertical CCD being represented by the layer 123), a transfer electrode 124, a $SiO_2$ insulating layer 125, a bias power supply 38, an aluminum light shield 126 for shielding the vertical CCD from light, and a transfer pulse terminal 127 through which a transfer pulse : is applied to the transfer electrode 124. When light illuminates the photodiode 121, electrons and holes are created in a pair within the photodiode. The electrons are stored in the photodiode and the holes are delivered as a current Ip to the bias power supply 38 through the p-type well. Because the current Ip is attributable to the incident light, a quantity of light can be detected as the exposure current Ip proportional to the incident light.

This operation is the same as the operation of the MOS type image sensor and therefore, an electronic still camera based on the CCD image sensor can be constructed for realization of photometry and weighted photometry similar to those described in connection with the foregoing embodiments.

Although various embodiments of the image sensor directed to the weighted photometry have been described and they have proven themselves to be applicable to various types of weighted photometry, there has been no description as to how the camera is controlled using the weighted photometry output signal because this problem is rather related to how the weighted photometry output signal is used by the photometric circuit and the control circuit. For example, a way to approach this problem is to use multi-program automatic exposure. Incidentally, in the sixth embodiment of FIG. 13, the automatic iris control is effected using the video signal during the video mode while the image sensor being driven in the read mode but obviously, the automatic iris operation may be performed using the photometry output signal delivered out of the image sensor.

Photometry signals delivered out of many parts on the imaging surface of the image sensor may obviously be used and combined together in order to perform automatic iris control corresponding to automatic exposure by multi-photometry used in the 35 mm camera. This permits a control mode based on multi-photometry on many image sensors, leading to realization of a highly easy-to- C operate electronic still camera with video mode.

It will be also obvious that various types of control including control of the iris based on the photometry output signal delivered out of the image sensor in accordance with teachings of the present invention may be applied to a moving picture video camera using the image sensor.

As has been described, according to the invention, the image sensor can also be used as the sensor for photometry thus making it possible to effect the direct photometry which proceeds concurrently with photographing and to effect the photometry at desired parts on the image sensor and therefore a simplified, highly functional and exposure controllable electronic camera can be materialized.

We claim:

1. An imager comprising:
an image sensor;
sensor drive means;
an image signal processing circuit;
incident light quantity adjusting means,
wherein said sensor drive means is operative to supply a drive signal to said image sensor,
wherein said image sensor includes a plurality of photodiode s each comprised of a p-type semiconductor layer and an n-type semiconductor layer whereby positive charge r carriers are create d in said p-type semiconductor layer and negative charge carriers are created in said n-type semiconductor layer in accordance with a quantity of light incident to said photodiode, an image signal output terminal through which an image signal due to first carrie re stored in said photodiode and representative of one type of said positive and negative carriers is delivered in response to said drive signal, and a photometric signal output terminal through which second carriers representative of the other type are output to the outside of said image sensor,
wherein said image signal processing circuit is connected to said image signal output terminal and operative to reproduce a video signal from said image signal delivered out of said image sensor, and
wherein said incident light quantity adjusting means is operative to adjust the quantity of the light incident to said image sensor;
photometric means, connected to said photometric signal output terminal of said image sensor, for generating an incident light quantity signal from said second carriers; and
incident light quantity adjusting signal generation means connected to said photometric means and said incident light quantity adjusting means and being response to said incident light quantity signal from said photometric means to generate and supply an incident light quantity adjusting signal to said incident light quantity adjusting means to drive the incident light quantity adjusting means.

2. An imager according to claim 1 wherein said first carriers are electrons and said second carriers are holes.

3. An imager according to claim 2 where in said p-type semiconductor layer is divided into a plurality of regions respectively connected with said photometric signal output terminal from which signals due to said second carriers are supplied to said photometric means, and wherein said photometric means applies weights to respective signals due to said second carriers delivered from said photometric signal output terminal connected to the respective regions and thereafter adds said signals together to deliver a sum signal representative of an incident light quantity signal.

4. An imager according to claim 2 further comprising a substrate layer connected to said p-type semiconductor layer, and a clear circuit, connected to said image sensor, for decreasing electric potential at said p-type semiconductor layer of said image sensor and for shifting up said first carriers stored in said n-type semiconductor layer to said substrate layer.

5. An image r according to claim 4 wherein a signal output drain comprise d of an n-type semiconductor layer is provide d in said p-type semiconductor layer of said image sensor, and said p-type semiconductor layer has a thickness which is smaller at said photodiode than at a portion where said signal output drain is provided.

6. An imager according to claim 2 wherein a signal output drain comprised of an n-type semiconductor layer is provided in said p-type semiconductor layer of said image sensor, and a clear circuit is connected to said image sensor to increase electric potential at said p-type semiconductor layer and shift said first carriers to said signal output drain.

7. An imager according to claim 1 wherein said first carriers are holes and said second carriers are electrons.

8. An imager according to claim 7 wherein said n-type semiconductor layer is divided into a plurality of regions respectively connected with said photometric signal output terminal from which signals due to said second carriers are supplied to said photometric means, and said photometric means applies weights to respective signal due to said second carriers delivered from said photometric signal output terminal connected with the respective regions and thereafter adds said signals together to deliver a sum signal representative of an incident light quantity signal.

9. An imager according to claim 7 further comprising a substrate layer connected to said n-type semiconductor layer, and a clear circuit, connected to said image sensor, for decreasing electric potential at said n-type semiconductor layer of said image sensor and for shifting said first carriers stored in said p-type semiconductor layer to said substrate layer.

10. An imager according to claim 9 wherein a signal output drain comprised of a p-type semiconductor layer is provided in said n-type semiconductor layer of said image sensor, and said n-type semiconductor layer has a thickness which is smaller at said photodiode than at a portion where said signal output drain is provided.

11. An imager according to claim 7 wherein a signal output drain comprised of a p-type semiconductor layer is provided in said n-type semiconductor layer of said image sensor, and a clear circuit is connected to said image sensor to increase electric potential at said n-type semiconductor layer and shift said first carriers to said signal output drain.

12. An imager according to claim 1 wherein said photometric means is integration photometric means.

13. An imager according to claim 1 further comprising display means for displaying incident light quantity information, wherein said photometric means comprises integration photometric means and logarithmic photometric means, said integration photometric means producing an output signal supplied to said incident light quantity adjusting signal generation means, said logarithmic photometric means producing an output signal supplied to said display means.

14. A photometric circuit for measuring the quantity of light incident to an image sensor having a plurality of photodiode s each comprised of a p-type semiconductor layer and an n-type semiconductor layer where by positive charge carriers are created in said p-type semiconductors layer and negative charge carriers are created in said n-type semiconductor layer in accordance with a quantity of light incident to said photodiode, an image signal output terminal through which an image signal due to first carriers stored in said photodiode and representative of one type of said positive and negative carriers is delivered of response to a drive signal for driving aid image sensor, and a photometric signal output terminal through which second carriers representative of the other type are delivered to the outside of said image sensor, wherein said photometric circuit includes photometric means, connected to said image sensor, for calculating an incident light quantity on the basis of said second carriers to generate an incident light quantity signal.

* * * * *